US010866790B2

(12) United States Patent
Das et al.

(10) Patent No.: US 10,866,790 B2
(45) Date of Patent: Dec. 15, 2020

(54) TRANSFORMING LOOPS IN PROGRAM CODE BASED ON A CAPACITY OF A CACHE

(71) Applicant: Advanced Micro Devices, Inc., Santa Clara, CA (US)

(72) Inventors: Dibyendu Das, Bangalore (IN); Pradeep H. Rao, Bangalore (IN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 74 days.

(21) Appl. No.: 16/206,773

(22) Filed: Nov. 30, 2018

(65) Prior Publication Data

US 2020/0174764 A1    Jun. 4, 2020

(51) Int. Cl.
*G06F 9/45* (2006.01)
*G06F 8/41* (2018.01)

(52) U.S. Cl.
CPC .......... *G06F 8/4434* (2013.01); *G06F 8/4443* (2013.01); *G06F 8/452* (2013.01)

(58) Field of Classification Search
None
See application file for complete search history.

(56) References Cited

U.S. PATENT DOCUMENTS

| 9,830,133 | B1 * | 11/2017 | Baskaran | ................... | G06F 8/41 |
| 2007/0294682 | A1 * | 12/2007 | Demetriou | ................ | G06F 8/45 |
| | | | | | 717/153 |
| 2008/0244533 | A1 * | 10/2008 | Berg | .................... | G06F 11/3447 |
| | | | | | 717/128 |
| 2008/0250401 | A1 | 10/2008 | Puri et al. | | |
| 2010/0070956 | A1 * | 3/2010 | Leung | ..................... | G06F 8/452 |
| | | | | | 717/143 |
| 2011/0047534 | A1 * | 2/2011 | Ye | .......................... | G06F 8/443 |
| | | | | | 717/160 |
| 2012/0167069 | A1 * | 6/2012 | Lin | ........................ | G06F 8/456 |
| | | | | | 717/160 |

(Continued)

OTHER PUBLICATIONS

Gannon et al., Strategies for Cache and Local Memory Management by Global Program Transformation, 1988, 30 pages (Year: 1988).*

(Continued)

*Primary Examiner* — Lewis A Bullock, Jr.
*Assistant Examiner* — Tina Huynh
(74) *Attorney, Agent, or Firm* — Park, Vaughan, Fleming & Dowler LLP

(57) ABSTRACT

An electronic device acquires, from program code, two or more program code loops having specified data dependencies. The electronic device places each of the program code loops into a corresponding blocking loop, each blocking loop including at least one blocking loop induction variable that is incremented by a corresponding block size and used to specify a number of iterations for at least one internal loop induction variable of the respective program code loop. The electronic device fuses the blocking loops into a fused loop by placing all of the blocking loops in the fused loop and replacing the blocking loop induction variables of the blocking loops with a fused loop induction variable that is incremented by the corresponding block size and used to specify the number of iterations for respective internal loop induction variables in the blocking loops.

20 Claims, 5 Drawing Sheets

(56) References Cited

U.S. PATENT DOCUMENTS

| | | | | |
|---|---|---|---|---|
| 2015/0106596 A1* | 4/2015 | Vorbach | ............... | G06F 9/3877 |
| | | | | 712/221 |
| 2015/0277876 A1* | 10/2015 | Yamanaka | .............. | G06F 8/423 |
| | | | | 717/152 |
| 2016/0350088 A1* | 12/2016 | Ravishankar | ......... | G06F 8/4434 |
| 2019/0042221 A1* | 2/2019 | Krishnaiyer | .......... | G06F 8/4434 |

OTHER PUBLICATIONS

Wolf et al., A Loop Transformation Theory and an Algorithm to Maximize Parallelism, 1991, 20 pages (Year: 1991).*

Zhenlin Wang, Cooperative Hardware/Software Caching for Next-Generation Memory Systems, Feb. 2004, 160 pages (Year: 2004).*

\* cited by examiner

```
L1:
        do ii=is,ie,b          ← BLOCKING LOOP CONDITIONAL STATEMENT 400
           do j = js, je
              do i = ii, min(ii+b-1,ie)
                 g(i,j) = u(i-1,j) - c1*u(i,j)              S1
              end do
           end do
        end do
L2:
        do ii=is,ie,b
           do j = js, je
              do i = ii, min(ii+b-1,ie)
                 u(i,j) = c1*g(i,j) + g(i+1,j)              S2
              end do
           end do
        end do
L3:
        do ii=is,ie,b
           do j = js, je
              do i = ii, min(ii+b-1,ie)
                 g(i,j) = u(i,j-1) - c1*u(i,j)              S3
              end do
           end do
        end do
L4:
        do ii=is,ie,b
           do j = js, je
              do i = ii, min(ii+b-1,ie)
                 v(i,j) = c2*g(i,j) + g(i,j-1)              S4
              end do
           end do
        end do
```

BLOCKING LOOP INDUCTION VARIABLE 402

LOOP INDUCTION VARIABLE 304

FIG. 4

```
                    FUSED LOOP
                 INDUCTION VARIABLE
                        502            FUSED LOOP CONDITIONAL
                         ╱                    STATEMENT
                        ╱      ╱╱                 500
                  ┌─────────┐╱
                  ┊do ii=is,ie,b┊
                     do j = js, je
       LOOP            do i = ii, min(ii+b-1,ie)
    INDUCTION  ----------┘ g(i,j) = u(i-1,j) - c1*u(i,j)      S1
    VARIABLE            end do
       302           end do do j = js, je
                        do i = ii, min(ii+b-1,ie)
                           u(i,j) = c1*g(i,j) + g(i+1,j)      S2
                        end do
                     end do do j = js, je
                        do i = ii, min(ii+b-1,ie)
                           g(i,j) = u(i,j-1) - c1*u(i,j)      S3
                        end do
                     end do do j = js, je
                        do i = ii, min(ii+b-1,ie)
                           v(i,j) = c2*g(i,j) + g(i,j-1)      S4
                        end do
                     end do
                  end do
```

FIG. 5

TRANSFORMING LOOPS IN PROGRAM CODE BASED ON A CAPACITY OF A CACHE

BACKGROUND

Related Art

Some electronic devices include processors that execute program code, such as program code for software applications, operating systems, etc. Many of these electronic devices, in addition to including a large-capacity memory (e.g., "main" memory) and mass-storage devices for storing program code and data, also include one or more cache memories (or "caches"). Caches are fast-access memories that are used for storing copies of program code and/or data to enable rapid retrieval by processors for use when executing program code. Accessing data in caches is typically at least an order of magnitude faster than accessing data in the memory or the mass-storage device.

A common feature in program code is program code loops, for which one or more lines of program code may be executed repeatedly based on a loop condition. For example, one form of program code loops includes a loop counter or "induction variable" that is used for controlling a number of times that program code within the program code loop is executed. For this form of loop, the induction value is incremented (or otherwise adjusted) from a starting value to an ending value and program code in the body of the program code loop is executed each time the induction variable is incremented until the ending value is reached. Such a program code loop can be used for performing operations such as mathematical or logical operations on elements in an array data structure, monitoring for specified conditions, etc. In some cases, program code loops are nested, so that program code loops, or "outer" program code loops, themselves include other program code loops, or "inner" program code loops. Nested program code loops can be used for performing operations such as mathematical or logical operations on a multi-dimensional array data structure, etc.

Executing program code loops using data acquired from a cache is, as with other forms of program code execution, significantly faster than executing program code loops using data acquired from memory or a mass-storage device. The benefits of using caches can be reduced or lost, however, due to the amount of data generated by program code in some program code loops. For example, a single program code loop with a large number of iterations or nested program code loops may generate sufficient data that data that was generated during earlier iterations of the program code loop(s) and stored in the cache is overwritten. When data is overwritten, the data is removed or "evicted" from the cache and stored in the memory before a corresponding entry in the cache is overwritten. When subsequent program code, including program code loops themselves or subsequent program code loops, depends on the data generated by an earlier program code loop, a processor executing the program code may be forced to acquire the data from memory. In addition, when such data is acquired from memory, the data may be used to overwrite data in the cache from later iterations of the program code loop, thereby continuing the thrashing of data in the cache.

BRIEF DESCRIPTION OF THE FIGURES

FIG. 4 presents a pseudocode example of a set of program code loops following a blocking operation in accordance with some embodiments.

FIG. 5 presents a pseudocode example of a set of program code loops following a fusing operation in accordance with some embodiments.

Throughout the figures and the description, like reference numerals refer to the same figure elements.

DETAILED DESCRIPTION

Figure 1:
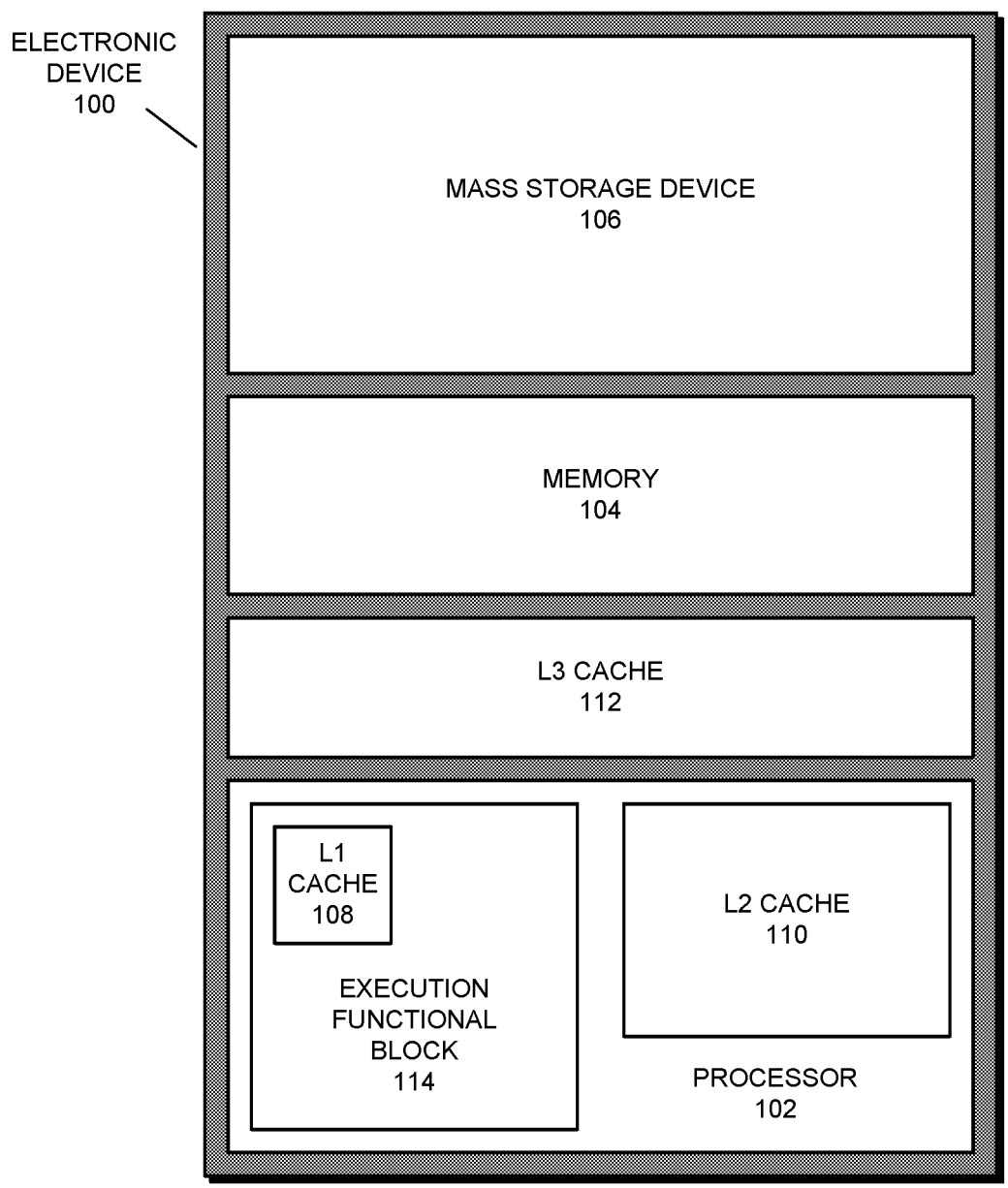
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Data access (or access): a data access in a cache memory (or "cache") includes any operation in a cache that can cause an eviction of a data item in order to free space for storing, in the cache, an accessed data item. For example, a data access is made in a cache when reading a given data item, because the given data item is loaded to the cache from a lower level cache or memory—which may require the eviction of an existing data item in the cache to make space for storing the given data item. Writing a data item in a cache is another form of data access.

Overview

In the described embodiments, an electronic device that includes a processor, a memory, and a cache memory (or "cache") performs operations for transforming program code that includes two or more program code loops to enable more efficient use of data stored in the cache. The program code loops include at least one data dependency, and thus program code loops after a first of the program code loops in the program code use data generated by an earlier program code loop. For example, a given program code loop may write values to elements of an array data structure and a subsequent program code loop may read values from and/or write values to the array data structure. When transforming the program code, the electronic device modifies and rearranges the program code loops to increase the reuse of data stored in the cache that is generated by the program code loops and used by subsequent program code loops. In other words, the electronic device, based on properties of the program code loops and the cache, transforms the program code to organize the program code loops so that data generated by a given program code loop is retained in the cache for use by subsequent dependent program code loops. To do this, the electronic device introduces additional program code elements for limiting the number of iterations of program code loops that are executed at a time so that useful data is retained in the cache. Transforming the program code loops as described can help to avoid the program code loops overwriting useful data in the cache, i.e., the "thrashing" of data in the cache.

In some embodiments, for transforming the program code, the electronic device selects, from among a number of candidate program code loops (i.e., program code loops in the program code that are available for transformation), a set of program code loops to be transformed. During this operation, the electronic device first determines an allowable reuse distance based on a useable capacity of the cache, the usable capacity of the cache being the full capacity of the cache (e.g., number of available entries) as scaled or reduced by other consumers of cache capacity (i.e., other program code, etc.). The allowable reuse distance is the largest number of accesses of other data items that can be made between accesses in a cache of a given data item without the given data item being evicted. Using the reuse distance and a number of data accesses performed by each candidate program code loop, the electronic device selects the set of program code loops. The set of program code loops includes candidate program code loops for which specified accesses of data items are separated by less than the reuse distance, including accesses of the same data items by two or more separate program code loops.

In some embodiments, the electronic device next performs a blocking operation for the program code loops in the set of program code loops. For this operation, the electronic device places each of the program code loops in a respective blocking loop, which limits the iterations of the corresponding program code loop so that only a "block," or subset, of the iterations of the program code loop are executed at a time. For example, a program code loop having a total of N iterations may be placed in a blocking loop that is configured so that a block of N/M iterations of the program code loop are executed for each iteration/step of the blocking loop—and thus M iterations/steps of the blocking loop are required for executing all of the iterations of the enclosed program code loop. For this operation, the electronic device first determines a block size to be used as a step size of the blocking loops. The electronic device determines the block size based at least in part on a number of data accesses to be made by the program code loops in the set of program code loops and a useable capacity of the cache for storing data items generated by the program code loops. The electronic device then reconfigures internal loop induction variables of the program code loops with upper and lower bounds that are dependent on the respective blocking loop induction variable, so that the respective blocking loop induction variable controls which iterations of the program code loops are executed. The electronic device also adds, to each program code loop, a corresponding blocking loop conditional statement in which the blocking loop induction variable is stepped in block-sized increments from a lower bound to an upper bound. When the blocking operation is completed, each program code loop includes a dependency on a respective blocking loop induction variable for controlling which iterations of the program code are executed—and block-sized groups of iterations of the program code loop are executed with each iteration/step of the blocking loop.

In some embodiments, the electronic device then performs a fusing operation for the program code loops in the set of program code loops. For this operation, the electronic device combines the separate blocking loops into a single fused loop. The electronic device collects all of the blocking loops into a newly-created fused loop. The electronic device adds, to the fused loop, a fused loop conditional statement in which a fused loop induction variable is stepped in block-sized increments from a lower bound to an upper bound. The fused loop induction variable is the same as the individual blocking loop induction variables (e.g., has the same name). The electronic device next removes, from the blocking loops within the fused loop, the blocking loop conditional statements and other related program code, thereby stripping the blocking loop program code from the program code loops—but leaving the dependency on the blocking loop induction variable in the program code loops. Because the fused loop induction variable is the same as the blocking loop induction variables, removing the blocking loop program code from the blocking loops within the fused loop has the effect of making the internal induction variables in each of the program code loops in the fused loop dependent on the single fused loop induction variable. In this way, the internal induction variables in the program code loops are unified so that iterations of the program code loops in the fused loop are performed in block-sized steps based on a value of the fused loop induction variable.

In some embodiments, when determining and/or configuring some or all of the block size, the internal induction variables, the blocking loop induction variables, and the fused loop induction variable, the electronic device considers the particular iteration bounds of each of the program code loops in the set of program code loops. The electronic device also ensures, during the blocking operation and/or the fusing operation, that the each/all of the blocking loops and/or the fused loop perform correct numbers of iterations. For example, a lower bound and upper bound of the fused loop can be set so that the internal loop induction variables are able to iterate through all the necessary iterations—and the internal loop induction variables can themselves be limited, via corresponding lower and upper bounds, to the appropriate iterations. In this way, program code loops having different lower and upper bounds (or different loop "shapes") can be included within the fused loop.

By performing the above-described operations to transform the program code loops, the program code loops can be transformed "in-place," i.e., without the extensive program code loop modifications used in some existing program code loop transformation techniques. This means that transforming program code as described is simpler, less computationally intense, and less error prone. In addition, the blocking operation and fusing operation do not require the safety and dependence checks of some existing program code loop transformation techniques—checks that increase exponentially when combining program code loops beyond a pair of adjacent program code loops. This means that transforming program code as described herein is less computationally intense than existing transformation techniques. Also, transforming program code as described herein can be applied across multiple program code loops and program code loops having different lower and upper bounds, even in the presence of intervening program code loops and/or control flow. This means that program code loops included in larger sections of program code can be transformed to better reuse data in caches. The described embodiments therefore enable more efficient transforming of program code, more compact and less-altered program code, and better use of cache resources when program code is executed, which lead to better performance for electronic devices that execute the program code. Better-performing electronic devices in turn lead to higher user satisfaction.

System

The described embodiments include an electronic device that performs operations for transforming program code loops in program code. FIG. 1 presents a block diagram illustrating electronic device 100 in accordance with some embodiments. Electronic device 100 includes processor 102, memory 104, mass storage device 106, and a number of cache memories, i.e., level one (L1) cache 108, level two (L2) cache 110, and level three (L3) cache 112 (which are collectively called "the caches" herein). Generally, processor 102, memory 104, and the caches are implemented in hardware, i.e., using various circuit elements and devices. For example, processor 102, memory 104, and the caches can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of processor 102, memory 104, and the caches perform operations associated with transforming program code loops in program code.

Processor 102 is a functional block that performs computational and other operations in electronic device 100. For example, processor 102 may be or include one or more central processing unit (CPU) cores, graphics processing unit (GPU) cores, application specific integrated circuits (ASICs), field programmable gate arrays (FPGAs), etc. Processor 102 includes execution functional block 114, which is a functional block that performs operations for executing program code. For example, execution functional block 114 may execute program code for a program code compiler, interpreter, or other program code transformer that performs operations for transforming program code loops in program code as described herein. Execution functional block 114 includes elements such as pipelines, execution units, compute units, etc. that execute the program code.

Memory 104 is functional block in electronic device 100 that performs operations of a memory for electronic device 100 (e.g., a "main" memory). Memory 104 includes memory circuits such as fourth-generation double data rate synchronous dynamic random access memory (DDR4 SDRAM), static random access memory (SRAM), and/or other types of memory circuits for storing data and instructions (i.e., program code instructions) for use by functional blocks in electronic device 100 and control circuits for handling accesses of the data and instructions that are stored in the memory circuits and for performing other control or configuration operations.

Mass storage device 106 is a functional block that performs operations for storing data and instructions for access by other functional blocks in electronic device 100 (e.g., execution functional block 114, the caches, etc.). Mass storage device 106 includes a higher-capacity non-volatile storage medium such as a disk drive, optical drive, semiconductor memory, etc. In some embodiments, data and instructions are copied from mass storage device 106 to memory 104 and the caches to enable access by the other functional blocks, and data and instructions can be stored in mass storage device 106 by the other functional blocks.

The caches include a hierarchy of cache memory (or "cache") functional blocks, each of which is used for storing a limited number of copies of data and instructions for access by other functional blocks in electronic device 100 (e.g., execution functional block 114, etc.). The hierarchy of caches includes L1 cache 108, L2 cache 110, and L3 cache 112. Each of L1 cache 108, L2 cache 110, and L3 cache 112 include memory circuits such as static random access memory (SRAM) memory circuits that are used for storing the copies of data and instructions, as well as control circuits for handling accesses of the memory circuits. Proceeding in the order L1 cache 108, L2 cache 110, and L3 cache 112, in some embodiments, each cache is larger in capacity (i.e., includes more memory circuits) and is slower for execution functional block 114 to access (e.g., is located further from execution functional block 114, etc.). For example, in some embodiments, L1 cache 108 is the smallest and fastest of the caches and is located closest to execution functional block 114, making L1 cache 108 the fastest for execution functional block 114 to access among the caches. In describing the hierarchy of caches, L1 cache 108 is the "highest" level in the hierarchy, and L2 cache 110 and L3 cache 112 in successively "lower" levels of the hierarchy.

Electronic device 100 is simplified for illustrative purposes. In some embodiments, however, electronic device 100 includes additional or different functional blocks, subsystems, and elements. For example, electronic device 100 may include display subsystems, power subsystems, input-output (I/O) subsystems, etc. In addition, although a single processor and a hierarchy of caches is shown in electronic device 100, the described embodiments are operable with a different number or arrangement of processors and/or caches. For example, in some embodiments, electronic device 100 includes two or more processors. Electronic device 100 generally includes sufficient functional blocks, elements, etc. to perform the operations herein described.

Electronic device 100 can be, or can be included in, any device that performs the described operations. For example, electronic device 100 can be, or can be included in, a desktop computer, a laptop computer, a wearable electronic device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Transforming Program Code

Figure 2:
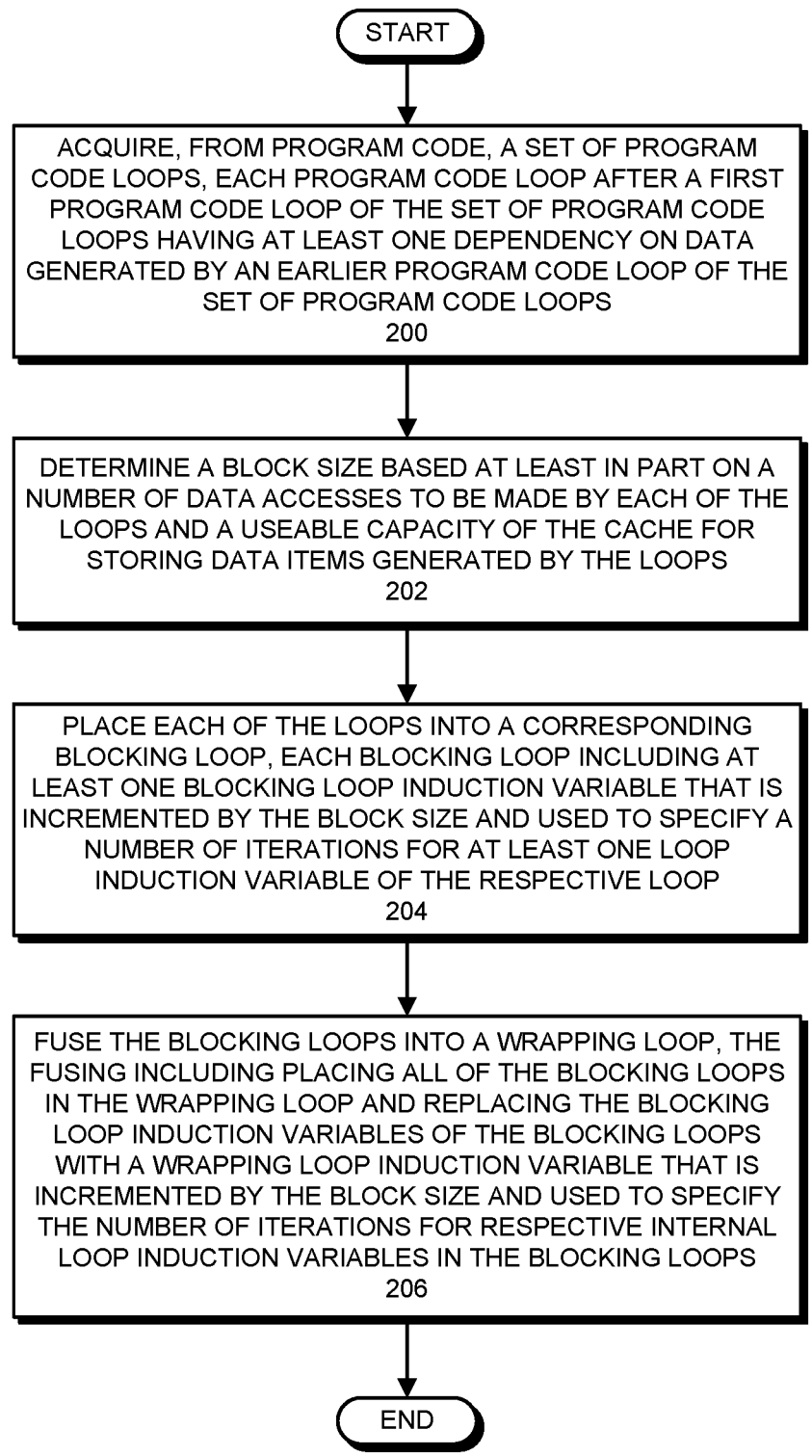
FIG. 2 presents a block diagram illustrating a process for transforming program code in accordance with some embodiments.

In the described embodiments, an electronic device transforms program code so that program code loops in the program code are better able to reuse program code loop data stored in a cache. FIG. 2 presents a block diagram illustrating a process for transforming program code in accordance with some embodiments. The operations shown in FIG. 2 are presented as a general example of operations performed by some embodiments. The operations performed by other embodiments include different operations, operations that are performed in a different order, and/or operations that are performed by different entities or functional blocks.

For the example presented in FIG. 2, the transformation of program code (i.e., the rearranging of program code loops) can occur during any operation during which an electronic device transforms program code. For example, in some embodiments, the transformation of program code is performed during a compilation operation, during which a compiler converts program code in a higher-level programming language (e.g., C++, Java, Perl, etc.) from source files with the program code, such as source files created by a programmer, to machine code or another form of code executable by a processor of an electronic device. As another example, in some embodiments, the transformation of program code is performed when interpreting program code files for an interpreted programming language. As yet another example, in some embodiments, the transformation of program code is performed when optimizing or updating program code in existing executable files, i.e., which have already been separately compiled or otherwise generated. As yet another example, in some embodiments, the transformation of program code is performed when optimizing source files to generate optimized program code without also compiling the source code files. In these embodiments, the "optimizing" and generating "optimized program code" involve improving one or more characteristics of an initial state of the program code, such as by reconfiguring or rearranging the program code so that the program code executes faster, with less instructions, with less operations or sub-operations (e.g., microcode operations in an executing processor, etc.), with more efficient use of particular computational elements (e.g., processor cores, etc.) or memories (e.g., cache memories, a main memory, etc.), etc.

Although the blocking operation and fusing operation are shown and described as separate operations for the example in FIG. 2, in some embodiments, the operations are combined. In these embodiments, the transforming of program code may be performed without explicitly creating program code in an intermediate state. The "placing" of each program code loop into a blocking loop may therefore be a logical operation, i.e., an intermediate operation in a series of operations for generating the fused loop, and may not involve the actual generation of modified program code.

Although a transformation of program code is described for FIG. 2 in which only one of two program code conditional statements/loop induction variables (also called "internal" induction variables) are modified (see, e.g., FIGS. 3-5, induction variable i), the described embodiments can transform program code loops having any number of conditional statements/loop induction variables. Generally, the described embodiments can limit the number of iterations of program code loops having any number of conditional statements/induction variables so that useful data items generated by program code loops are retained in the cache for accesses by other program code loops. This includes nested program code loops, such as the i and j program code loops shown in FIG. 3.

The operations in FIG. 2 start when an electronic device acquires, from program code, a set of program code loops, each program code loop after a first program code loop of the set of program code loops having at least one dependency on data generated by an earlier program code loop of the set of program code loops (step 200). During this operation, the electronic device selects, from among a set of candidate program code loops in the program code, the set of program code loops. For example, if there are N program code loops in the program code, the electronic device may select M program code loops as the set of program code loops, where M<=N. Generally, any type of program code loops can be selected, e.g., "do-while" program code loops, "for" program code loops, etc., as long as the program code loops can be arranged as described herein.

In some embodiments, as part of the acquisition of program code loops in step 200, the electronic device determines an allowable reuse distance that is used for selecting the program code loops. Generally, the allowable reuse distance is used to determine which and how many program code loops can be transformed together—i.e., can be grouped into a single fused loop. The allowable reuse distance is a largest number of accesses in the cache that can be made between accesses in a cache of a given data item without the given data item being evicted. The allowable reuse distance is dictated by the useable capacity of the cache for storing and retaining data items generated by program code loops and used by subsequent program code loops. When determining the allowable reuse distance, therefore, the electronic device first determines a useable capacity of the cache, the usable capacity of the cache being the full capacity of the cache (e.g., number of available entries for storing data items) as reduced by other consumers of cache capacity (i.e., other program code, etc.). The electronic device then selects the set of program code loops from among candidate program code loops in the program code based at least on part on the reuse distance and a number of data accesses performed in each candidate program code loop. The set of program code loops therefore includes candidate program code loops that are selected because accesses of data items are separated by less than the reuse distance, including accesses of data items by two or more of the selected candidate program code loops.

In some embodiments, program code intervening between program code loops, such as other program code loops, control flow, etc. that does not affect the transformation of the program code loops is ignored when selecting the set of program code loops. Program code loops can therefore be included in the set of program code loops despite the existence of other program code between the program code loops when the other program code meets specified guidelines or rules. For example, in some embodiments, the program code between selected program code loops should not access cached data used by the selected program code loops, should not cause the eviction of cached data used by the selected program code loops, etc. The electronic device therefore analyzes intervening program code to ensure that the intervening program code does not affect the transformation of the program code loops before selecting the program code loops. In some embodiments, the transformations in the program code loops are performed without implementing code in the program code loops associated with intervening program code (i.e., without altering program code loops to handle operations of intervening program code that was not originally found in the program code loops).

In some embodiments, program code loops can be extracted from program code, e.g., from method calls, routines, etc., and in-lined or otherwise moved or placed in different locations in program code before or as the selecting is performed. For example, a program code loop that has a data dependency on an earlier program code loop (in terms of the order of in which the program code loops are executed) may be encountered in a function or method that is called in the program code. When program code correctness can be maintained, the particular instructions of the program code loop may be moved out of the function or method and placed elsewhere in the program code, such as following and adjacent to/neighboring the earlier program code loop—or may simply be included in a blocking loop (i.e., in-lined) as described below.

Figure 3:
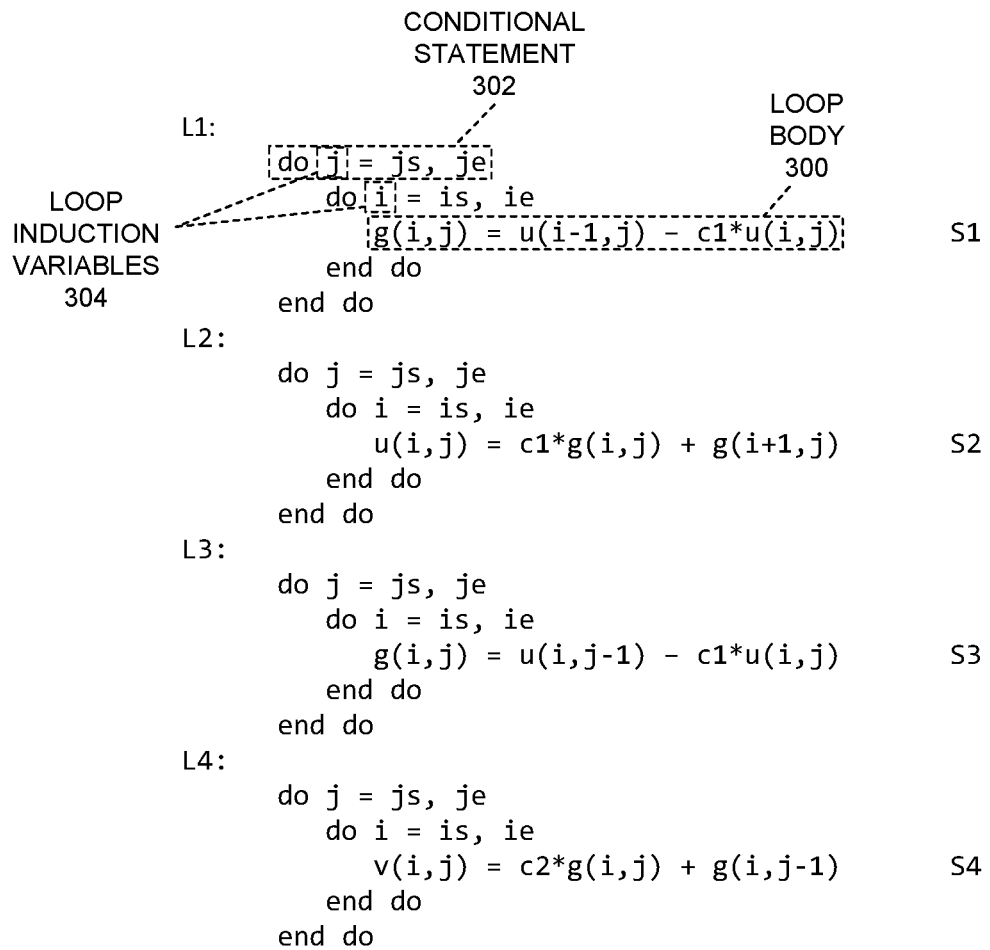
FIG. 3 presents a pseudocode example of a set of program code loops in accordance with some embodiments.

FIG. 3 presents a pseudocode example of a set of program code loops in accordance with some embodiments. The set of program code loops is an example of some program code loops that may be selected from program code for transformation in step 200. As can be seen in FIG. 3, the four program code loops, which are labeled L1-L4, include a single line of program code in the loop body, as shown by loop body 300. In addition, the program code loops include do-while conditional statements for induction variables i and j, as shown by, e.g., conditional statement 302 and induction variables 304. As is known in the art, starting from a lower bound, e.g., $j_s$, the program code in the loop body of a do-while program code loop is executed, the ending condition, e.g., $j==j_e$, is checked, and unless the ending condition is met, the induction variable is incremented and the loop body is executed again, a process that repeats until the ending condition is met. Note that, although a particular number and arrangement of program code loops is shown in FIG. 3, the described embodiments are operable with other numbers and forms of program code loops, including program code loops with more program code in the loop body, different numbers of conditional statements/induction variables, etc.

The electronic device then determines a block size based at least in part on a number of data accesses to be made by each of the program code loops and a useable capacity of the cache for storing data items generated by the program code loops (step 202). During this operation, the electronic device first determines a useable capacity of the cache, which is a portion of the cache that is available for storing, and retaining, data items generated by program code loops and accessed by one or more subsequent program code loops. The useable capacity of the cache is the full capacity of the cache in terms of available entries in the cache as reduced by the number of entries in the cache being used for other purposes (e.g., for storing data for other program code, etc.). For example, if the cache has 2 MB of capacity and 600 kB of entries are being used for other purposes, the usable capacity of the cache is 1.4 MB. The electronic device also determines the number of data accesses to be made by the program code loops in the set of program code loops, such as by analyzing accesses in each program code loop's program code. From the accesses made by each of the program code loops and the useable capacity, the electronic device determines the block size as a number of iterations of each program code loop in view of the iterations of all the other program code loops—and the data accesses in the cache performed thereby—that can be performed while retaining program code loop data in the cache. For example, it may be possible to perform blocks of 20, 100, or another number of iterations of each of the program code loops without evicting data stored in the cache and reused by one or more program code loops. Continuing the example shown in FIG. 3, in some embodiments, if N is the number of data accesses across the set of program code loops being transformed (i.e., L1-L4), $I=i_e-i_s$ is the inner loop traversal, $J=j_e-j_s$ is the outer loop traversal, and b is the block size, then $N*I*J/b<=$useable cache capacity.

The electronic device next places each of the program code loops into a corresponding blocking loop, each blocking loop including at least one blocking loop induction variable that is incremented by the block size and used to specify a number of iterations for at least one internal loop induction variable of the respective program code loop (step 204). Generally, this operation adds program code to each program code loop (and encloses each program code loop) to control a number of iterations of the loop body that are performed at a time—i.e., during a corresponding iteration/step of the blocking loop. During this operation, the electronic device adds, before the program code loop, a conditional statement (e.g., do-while conditional statement) that operates on the blocking loop induction variable and causes the blocking loop induction variable to be stepped in block-sized increments. The electronic device also replaces the original lower and upper bounds for the internal induction variable in the conditional statement in the loop body of the respective program code loop with references to the blocking loop induction variable.

FIG. 4 presents a pseudocode example of the set of program code loops from FIG. 3 following the blocking operation in step 204 in accordance with some embodiments. As can be seen in FIG. 4, and in comparison to the original state of the program code loops as shown in FIG. 3, each of program code loops L1-L4 has been modified to include a "do ii=$i_s$, $i_e$, b" blocking loop conditional statement, in which b is the block size, as shown by blocking loop conditional statement 400. In addition, the conditional statement in the body of the loops has been changed to use a lower bound of ii, i.e., blocking loop induction variable 402, and an upper bound of "min(ii+b−1, $i_e$)," which limits the iterations to one block-size away from ii or the original upper bound of i, $i_e$. The effect of these changes is that the iterations for i are limited between ii and ii+b−1 until reaching the upper bound of i, $i_e$. In the loop body for program code loop L1, i.e., S1, this means that g(i, j) is only computed for a block or subset of all of the original/pre-transformation range of i.

The electronic device then fuses the blocking loops into a fused loop, the fusing including placing all of the blocking loops in the fused loop and replacing the blocking loop induction variables of the blocking loops with a fused loop induction variable that is incremented by the block size and used to specify the number of iterations for respective internal loop induction variables in the blocking loops (step 206). During this operation, the electronic device collects the individual program code loops into a single fused loop. The electronic device also adds a fused loop conditional statement to the fused loop that uses a same induction variable as the blocking loop conditional statements, i.e., the blocking loop induction variables. The electronic device then removes each of the blocking loop conditional statements from the fused loop. The end result of these operations is that the blocking loops are removed from the program code, but the original program code loops retain their reliance on the corresponding blocking loop induction variable, which has been replaced by the fused loop induction variable. The program code loop induction variables that have bounds based on the fused loop induction variable will therefore proceed in blocks of b iterations (block-sized sets of iterations) for each iteration of the fused loop.

FIG. 5 presents a pseudocode example of the set of program code loops from FIG. 4 following the fusing operation in step 206 in accordance with some embodiments. As can be seen in FIG. 5, and in comparison to the state of the program code loops shown in FIG. 4, the loops are all collected into the fused loop (and thus no longer separately labeled as L1, L2, etc.) and the blocking loop conditional statement "do ii=$i_s$, $i_e$, b" has been removed from each of the blocking loops and replaced by a single matching fused loop conditional statement, i.e., fused loop conditional statement 500. For each iteration/step of the fused loop, the iterations for i for each of the original program code loops are limited between ii and ii+b−1 until reaching the upper bound of i, $i_e$, where ii is fused loop induction variable 502.

Although not shown in FIG. 5, in some embodiments, the fused loop can be included in an appropriate location in program code, such as at a location of program code loop L1 in the original program code or elsewhere. In addition, in some embodiments, the program code can be prepared for execution, such as in a compiler or interpreter, etc. and included in an executable file. The program code including the fused loop, whether in executable form, in the form of optimized source files, etc., can be stored on a computer-readable storage medium.

As described above, for the operations in FIGS. 2-5, i.e., for the transforming of program code loops, the electronic device uses upper and lower bounds for the fused loop are determined based on the upper and lower bounds for the iterations in the set of program code loops. The upper and lower bounds of the fused loop are set to enable all necessary iterations of the program code loops to be performed—and the conditional statements of the program code loops may be adjusted to avoid unneeded iterations. In other words, the fused loop will perform sufficient iterations that all of the program code loops included therein are completely executed and the conditional statements of each of the program code loops included in the fused loop may be adjusted to avoid performing unnecessary iterations that might otherwise be performed within the fused loop. In this way, the described embodiments are able to include program code loops having different loop lower and upper bounds (or differently "shaped" loops) in the fused loop (without altering program code within the body of program code loops).

For describing some embodiments, program code loops are described as performing operations. For example, a program code loop may be described as "accessing" data in a cache. When actions or operations are attributed to a program code loop, it is intended to mean that individual program code instructions in the body of the loop perform the indicated action or operation. Continuing the example, therefore, when a program code loop accesses data in a cache, what is happening is that one or more program code instructions in the body of the program code loop are causing an executing processor (e.g., processor 102) to make the access in the cache (e.g., L1 cache 108, L2 cache 110, etc.).

In some embodiments, a system (e.g., electronic device 100 and/or some portion thereof) uses code and/or data stored on a non-transitory computer-readable storage medium to perform some or all of the operations herein described. More specifically, the system reads the code and/or data from the computer-readable storage medium and executes the code and/or uses the data when performing the described operations. A computer-readable storage medium can be any device, medium, or combination thereof that stores code and/or data for use by a system. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, accelerated processing units (APUs), functional blocks, controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 100, processor 102, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A non-transitory computer-readable storage medium storing instructions that, when executed by a processor in an electronic device, cause the electronic device to perform a method for transforming program code that includes program code loops, the method comprising:

acquiring, from the program code, a plurality of program code loops, each program code loop after a first program code loop in the program code having at least one dependency on data generated by an earlier program code loop;

placing each of the program code loops into a corresponding blocking loop, each blocking loop including at least one blocking loop induction variable that is incremented by a block size and used to specify a number of iterations for at least one internal loop induction variable of the respective program code loop, the block size being determined based on an amount of data generated by the program code loops that is to be retained in a cache; and fusing the blocking loops into a fused loop, the fusing including placing all of the blocking loops in the fused loop and replacing the blocking loop induction variables of the blocking loops with a fused loop induction variable that is incremented by the block size and used to specify the number of iterations for respective internal loop induction variables in the blocking loops.

2. The non-transitory computer-readable storage medium of claim 1, wherein the method further comprises:

selecting the plurality of program code loops from among a plurality of candidate program code loops in the program code, the selecting including:

determining, based on a useable capacity of a cache, an allowable reuse distance between accesses in a cache of a data item generated by a program code loop and accessed by subsequent program code loops, the allowable reuse distance being a given number of data accesses; and selecting, as the plurality of program code loops, candidate program code loops that can be included within the fused loop based on numbers of data accesses in the candidate program code loops and the reuse distance.

3. The non-transitory computer-readable storage medium of claim 2, wherein the method further comprises:

selecting the plurality of program code loops from among a plurality of candidate program code loops despite the presence of intervening control flow program code in the program code between the candidate program code loops, wherein intervening control flow program code is not included within the blocking loops.

4. The non-transitory computer-readable storage medium of claim 2, wherein the useable capacity of the cache is proportional to a full capacity of the cache for storing data items as reduced by an amount of the cache being used for storing data items other than data items for the program code loops.

5. The non-transitory computer-readable storage medium of claim 1, wherein the method further comprises:

determining the block size based at least in part on a number of data accesses to be made by each of the program code loops and a useable capacity of the cache for storing data items generated by the program code loops.

6. The non-transitory computer-readable storage medium of claim 1, wherein zero or more of the blocking loop induction variables have different upper bounds and lower bounds, and the method further comprises:

determining a lower bound and an upper bound for the fused loop induction variable based on lower bounds and upper bounds of each of the blocking loop induction variables, the lower bound of the fused loop induction variable being equal to a lowest lower bound of the blocking loop induction variables and the upper bound being equal to a highest upper bound of the blocking loop induction variables.

7. The non-transitory computer-readable storage medium of claim 1, wherein at least one of the program code loops is located within a called routine or method in the program code and the method further comprises:

removing the at least one of the program code loops from the called routine or method; and inlining the at least one of the program code loops in a corresponding blocking loop.

8. The non-transitory computer-readable storage medium of claim 1, wherein the method further comprises:

generating executable program code based on the program code and the fused loop.

9. The non-transitory computer-readable storage medium of claim 1, wherein the method further comprises:

generating optimized program code based on the program code and the fused loop, the optimized program code being improved in one or more ways over an initial state of the program code.

10. The non-transitory computer-readable storage medium of claim 1, wherein each program code loop includes at least one induction variable and one or more program code instructions, the program code loop to repeat executing the program code instructions based on a value of the at least one induction variable.

11. A method for transforming program code that includes program code loops, the method comprising:

acquiring, from the program code, a plurality of program code loops, each program code loop after a first program code loop in the program code having at least one dependency on data generated by an earlier program code loop;

placing each of the program code loops into a corresponding blocking loop, each blocking loop including at least one blocking loop induction variable that is incremented by a block size and used to specify a number of iterations for at least one internal loop induction variable of the respective program code loop, the block size being determined based on an amount of data generated by the program code loops that is to be retained in a cache; and fusing the blocking loops into a fused loop, the fusing including placing all of the blocking loops in the fused loop and replacing the blocking loop induction variables of the blocking loops with a fused loop induction variable that is incremented by the block size and used to specify the number of iterations for respective internal loop induction variables in the blocking loops.

12. The method of claim 11, further comprising:

selecting the plurality of program code loops from among a plurality of candidate program code loops in the program code, the selecting including:

determining, based on a useable capacity of a cache, an allowable reuse distance between accesses in a cache of a data item generated by a program code loop and accessed by subsequent program code loops, the allowable reuse distance being a given number of data accesses; and selecting, as the plurality of program code loops, candidate program code loops that can be included within the fused loop based on numbers of data accesses in the candidate program code loops and the reuse distance.

13. The method of claim 12, further comprising:
selecting the plurality of program code loops from among a plurality of candidate program code loops despite the presence of intervening control flow program code in the program code between the candidate program code loops, wherein intervening control flow program code is not included within the blocking loops.

14. The method of claim 12, wherein the useable capacity of the cache is proportional to a full capacity of the cache for storing data items as reduced by an amount of the cache being used for storing data items other than data items for the program code loops.

15. The method of claim 11, further comprising:
determining the block size based at least in part on a number of data accesses to be made by each of the program code loops and a useable capacity of the cache for storing data items generated by the program code loops.

16. The method of claim 11, wherein zero or more of the blocking loop induction variables have different upper bounds and lower bounds, and the method further comprises:
determining a lower bound and an upper bound for the fused loop induction variable based on lower bounds and upper bounds of each of the blocking loop induction variables, the lower bound of the fused loop induction variable being equal to a lowest lower bound of the blocking loop induction variables and the upper bound being equal to a highest upper bound of the blocking loop induction variables.

17. The method of claim 11, wherein at least one of the program code loops is located within a called routine or method in the program code and the method further comprises:
removing the at least one of the program code loops from the called routine or method; and
inlining the at least one of the program code loops in a corresponding blocking loop.

18. The method of claim 11, further comprising:
generating executable program code based on the program code and the fused loop.

19. The method of claim 11, further comprising:
generating optimized program code based on the program code and the fused loop, the optimized program code being improved in one or more ways over an initial state of the program code.

20. The method of claim 11, wherein each program code loop includes at least one induction variable and one or more program code instructions, the program code loop to repeat executing the program code instructions based on a value of the at least one induction variable.

* * * * *